United States Patent

[11] 3,619,619

[72] Inventor John P. Skurla
  Warminster, Pa.
[21] Appl. No. 837,243
[22] Filed June 27, 1969
[45] Patented Nov. 9, 1971
[73] Assignee Physitech, Inc.
  Willow Grove, Pa.

[54] AUTOMATIC BIAXIAL ELECTROOPTICAL DISPLACEMENT INDICATOR
6 Claims, 12 Drawing Figs.

[52] U.S. Cl. .............................................. 250/203 CT,
  250/217 CR, 315/19
[51] Int. Cl. ............................................. G01j 1/20
[50] Field of Search ....................................... 250/203,
  217 CR, 203 CT; 315/19

[56] References Cited
UNITED STATES PATENTS

| | | | |
|---|---|---|---|
| 3,240,942 | 3/1966 | Birnbaum | 250/203 CTS |
| 3,495,087 | 2/1970 | Starer | 250/203 X |
| 3,495,090 | 2/1970 | Revesz | 250/236 |
| 3,507,991 | 4/1970 | Scotchie | 250/203 X |
| 3,513,318 | 5/1970 | Birnbaum | 250/203 CTS |

Primary Examiner—James W. Lawrence
Assistant Examiner—C. M. Leedom
Attorney—Paul & Paul ABSTRACT: An apparatus is disclosed for simultaneously detecting and measuring biaxial displacement, as for example, vibration of a physical body, or angular rotation of a shaft. An image analyzer tube is employed which is focused on the optical discontinuities of a two-dimensional target placed on the body. For measurement of angular rotation, a mirror placed on the shaft reflects the image of the remotely placed target to the tube. Control circuitry causes the system to sweep the field of view until orthogonal optical discontinuities are detected, and then to lock onto and follow the location of the target. Deflection signals are applied alternately to the horizontal and vertical yokes of the tube to scan the image across the tube aperture at a rate which is high relative to the expected rate of vibration. The value of the deflection signal is measured at the instant the optical discontinuity crosses the aperture and from this sampled measurement of the deflection signal an information signal is derived which is indicative of the position of the image at that instant. The resulting signal, which carries combined information of both axial positions, is processed by a biaxial separation amplifier which yields two distinct signals representing the orthogonal movements.

INVENTOR.
John P. Skurla
BY
Paul + Paul
ATTORNEYS.

PATENTED NOV 9 1971

INVENTOR.
John P. Skurla

BY Paul + Paul

ATTORNEYS.

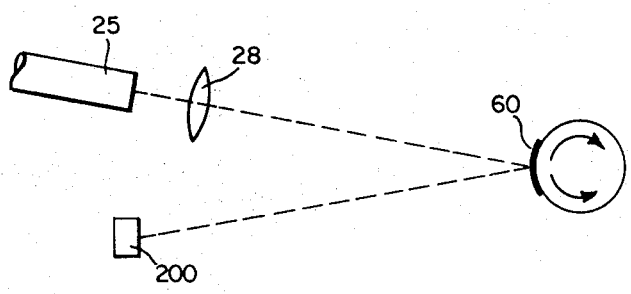
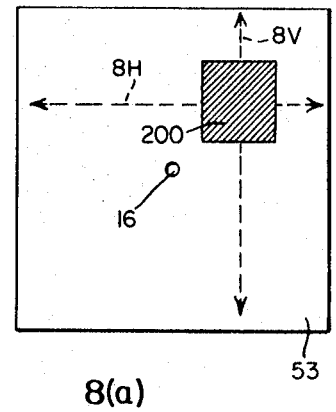
8(a)
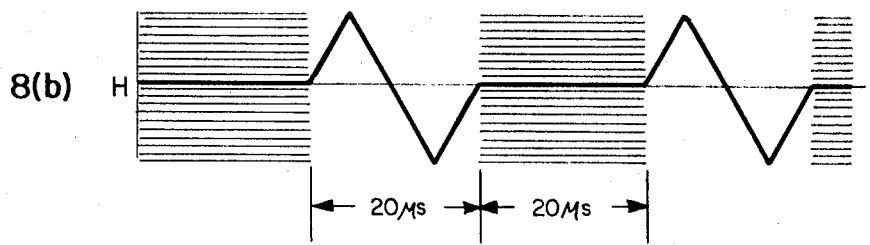
8(b) H
8(c) V
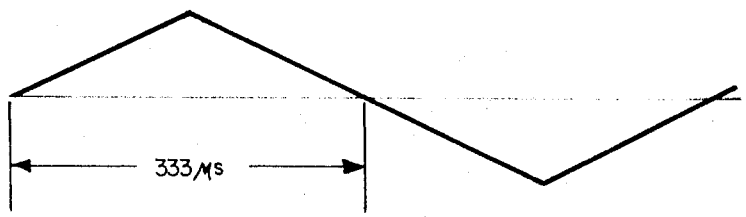
8(d)
*Fig. 7*
*Fig. 8*

3,619,619

AUTOMATIC BIAXIAL ELECTROOPTICAL DISPLACEMENT INDICATOR

BACKGROUND OF THE INVENTION

1. Field of the Invention

This invention relates to a biaxial electro-optical device employing multiplexing techniques for use as a two-dimensional displacement indicator, and more particularly, a displacement indicator having an automatic search and lock-on circuit which enables the device to find and follow a moving target within the field of view.

2. Description of the Prior Art

The apparatus or system of the present invention is different in significant respects and is to be distinguished from prior art devices and systems of which I am aware. A common type of prior art system is the one in which the output of the camera tube is fed back to the deflection coils to hold the optical discontinuity being tracked at the aperture of the tube. This type of system relies on feedback or classical servo-loop signals. In contradistinction to the servo type of system, an electro-optical displacement indicator was disclosed by Robert Starer in an application for U.S. pat., Ser. No. 509,786, filed Nov. 26, 1965. In that system, no servosystem techniques or feedback from the output of the camera tube to the deflection circuits are employed. Rather, the deflection signals are applied to the deflection coils of the camera tube to scan the image across the aperture. The value of the deflection signal is measured at the instant the optical discontinuity crosses the aperture, and from such instantaneous measurement of the deflection signal, an information signal is derived which is indicative of the position of the image at such instant.

None of the aforementioned devices or systems contain any provision or circuitry for searching for and locking onto a target which is not initially in the field of view of the camera tube. Thus, if the vibrating object being monitored were to be displaced such that the optical discontinuity was temporarily lost, the device would have no capability for reacquiring same. Also, the devices known to the prior art are all strictly axial, or one dimensional, having the limited capability of tracking displacement in only one dimension. Further, the prior art devices are limited to detection of linear displacement, and cannot track angular displacement.

SUMMARY OF THE INVENTION

The primary object of this invention is to provide an automatic biaxial electro-optical displacement indicating device or system for detecting, measuring, observing and/or indicating two-dimensional displacement or position of a vibrating target.

Another object is to provide such a system having lock-on circuitry for automatic search and acquisition of the target.

A further object is to provide such a system having capability of linear displacement measurement.

It is a further object of this invention to provide a system which can be used to detect angular motion of a rotating object.

It is a further object of this invention to provide such a system in which the control panel is separate from the optical head, thereby allowing for remote control operation.

A further object of this invention is to provide such a system in which an electronically reproduced image appears on a control panel for ready viewing by the operator.

Accordingly, in the device or system of the present invention, deflection signals are applied alternately to the horizontal and vertical deflection coils (or deflection plates) of the camera tube to alternately scan the image across the aperture horizontally and vertically. In the lock-on phase of operation, a 1.5 kHz. sweep signal provides a relatively slowly varying bias signal which is applied to one deflection coil while one cycle of the high-frequency sweep signal is applied to the other deflection coil. During the next cycle of the high-frequency sweep, the signals to the two coils are switched, providing alternate sweeping of the image horizontally and vertically, with the relatively slowly varying bias causing the entire field of view to be searched within the time of one period of the bias sweep signal. Upon finding the target discontinuity in both axial directions, bias signals representing the target location are provided to the deflection coils, the 1.5 kHz. bias signal is discontinued, and the system proceeds with normal biaxial scanning.

There is no attempt to maintain and hold the image at the aperture. The rate or frequency of scanning is preferably, but not necessarily, made high relative to the expected rate or frequency of vibration or movement of the body or other target being observed. The value of the deflection signal is sampled at the instant the optical discontinuity (which separates the target from the object) crosses the aperture, and from this instantaneous measurement of the deflection signal, an information signal is derived which is indicative of the position of the image at that instant. The timing circuitry which gates the two deflection coil amplifiers also provides control signals to separate the horizontal and vertical components of the information signal. Thus, two-channel movements of a target may be observed and measured.

In order to measure angular rotation of a shaft, where direct lineal observation would not detect angular rotation, a target providing an optical discontinuity is positioned adjacent to the optical head and remote from the rotating object. A mirror is placed on the rotating object, and the optical head, target and mirror are positioned relative to each other such that the target image is within the field of view of the optical head. Angular movement of the object will be translated by the mirror into effective lineal displacement within the tube's field of view.

BRIEF DESCRIPTION OF THE DRAWINGS

FIG. 7 is a diagram of the mirror system utilized for observation and detection of angular movement.

FIG. 8 is a diagram of the manner in which the target is detected during the lock-on phase.

DESCRIPTION OF THE PREFERRED EMBODIMENT

Figure 1:
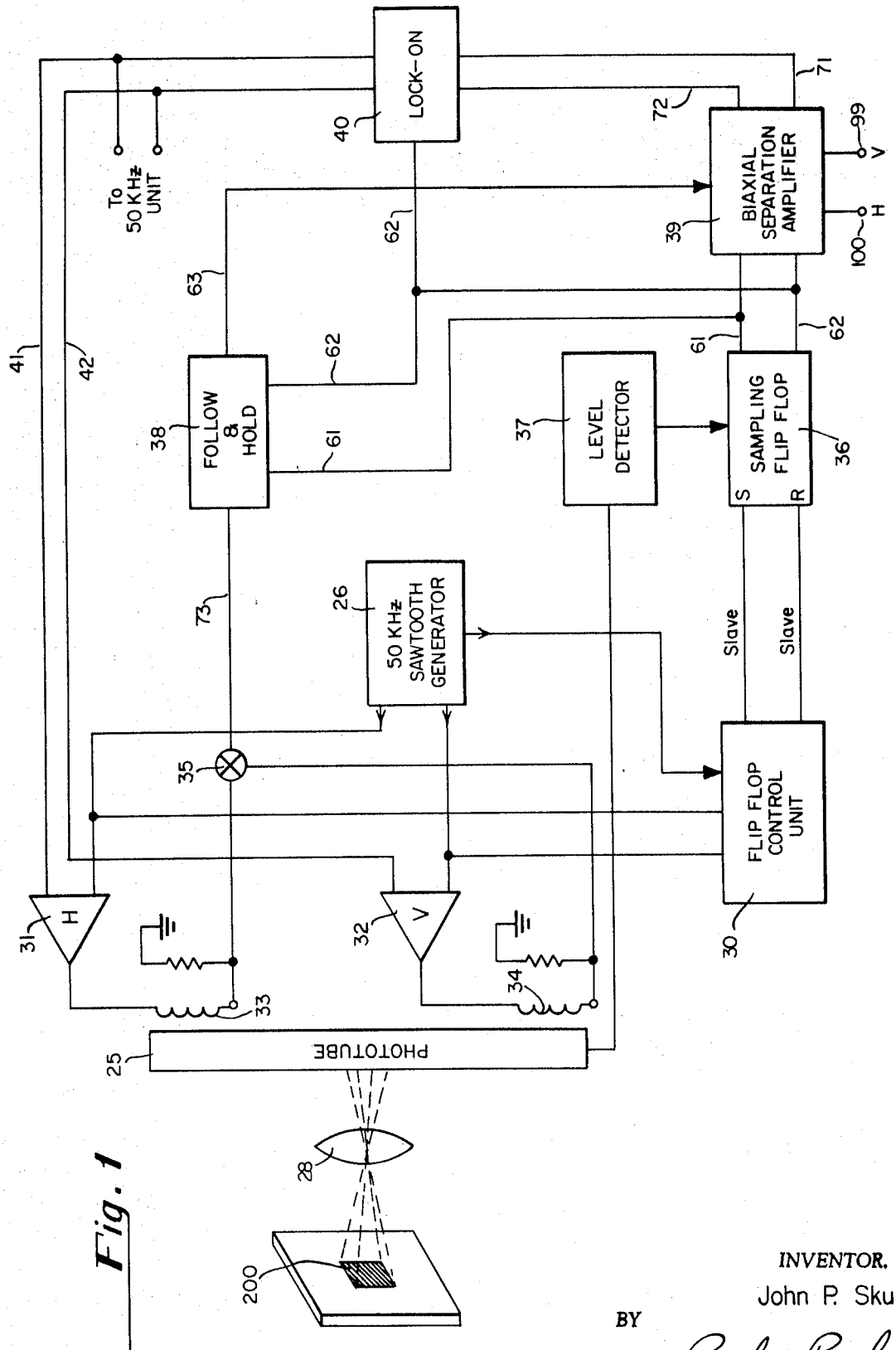
FIG. 1 is a block diagram of an automatic biaxial electro-optical displacement indicating system embodying one form of the present invention.

Referring now to the drawings, FIG. 1 is a block diagram of a complete automatic biaxial electro-optical displacement indicator system. The basic system includes the camera tube 25, preferably a phototube of the image analyzer type, in which scanning signals are developed for each axis. A 50 kHz. sawtooth generator 26 generates the deflection signal for both horizontal and vertical coils. A control signal from generator 26 controls flip-flop control unit 30, the outputs of which gate the sawtooth signal alternately into the horizontal deflection driver 31 and vertical deflection driver 32. The outputs from horizontal deflection coil 33 and vertical deflection coil 34 are combined at summing junction 35 producing a continuous waveform representing the combined deflection coil signals.

The same output signals which are coupled from flip-flop control unit 30 to the horizontal and vertical deflection drivers are coupled to sampling flip-flop 36 as slaving signals. Flip-flop 36 is a conventional flip-flop circuit which will set or reset upon introduction of a triggering signal depending upon the type of slaving signal applied. For example, it will set only when there is a slaving signal from flip-flop unit 30 on the set input, and it will reset only when there is a slaving signal from flip-flop unit 30 on the reset input terminal. The trigger input into sampling flip-flop 36 is supplied by a level detector 37 which operates upon the output of the phototube 25. The function of level detector 37 is to convert the phototube output waveform as shown in FIG. 9(a) into a rectangular pulse waveform, the pulse positions representing occurrences where the target discontinuity is scanned across the aperture.

The outputs of sampling flip-flop 36 are applied to the follow and hold circuit 38, which operates upon the combined deflection coil signal shown in FIG. 9(f). The sampling flip-flop signals are synchronized such that the follow and hold circuit will follow the incoming deflection signal (representing one of the two axial signals) until the instant when target discontinuity is detected by level detector unit 37, at which point the deflection coil signal (representing the displacement along that particular axis) is held with a first holding circuit. The follow and hold circuit 38 then traces the signal from summing junction 35 until the other axial discontinuity is detected, at which moment the deflection coil signal for such other axis is held in a second holding circuit, and the procedure is repeated. Thus, each channel is sampled once every other cycle of the 50 kHz. sawtooth, or at a 25 kHz. rate, and held while the other channel is being sampled. The output of follow and hold unit 38 is alternately the first channel while it is holding, and then the second channel while it is holding. Thus, a continuous signal is generated which represents the alternately sampled, or multiplexed, deflection signals, each sample bearing information relating to the target discontinuity of its respective axis.

The output of follow and hold circuit 38 is coupled to the biaxial separation amplifier 39, which is slaved by the same sampling flip-flop signals as are coupled to the follow and hold circuit. The biaxial separation amplifier operates on the incoming signal to separate the information into two distinct channels. This is done by feeding the follow and hold signal into a first output channel (e.g., vertical) for the duration of the first holding period, and holding such signal for the duration of the second holding period. During such second period, the follow and hold signal is fed to a second output channel (e.g., horizontal). Thus, the distinct components of the signal generated by the follow and hold circuit, representing the two sampled deflection signals, are separated and held in two output channels. These signals are coupled through conventional amplifiers, and can then be displayed on a cathode-ray oscilloscope or with any conventional display apparatus.

Still referring to FIG. 1, the function of lock-on circuit 40 can be seen. Lock-on circuit 40 is driven by an output from sampling flip-flop 36, which output occurs only when target discontinuity has been obtained in both directions, i.e., on both axes. If this condition does not obtain, i.e., if there is no output from the level detector 37, or only an output for one axis, sampling flip-flop 36 will not be periodically set and reset. Lock-on circuit 40 is designed such that in the absence of a periodic input signal from sampling flip-flop 36, a 1.5 kHz. signal, provided by a conventional oscillator which is part of lock-on circuit 40, is coupled through leads 41 and 42 to horizontal deflection driver 31 and vertical deflection driver 32 respectively. Leads 41 and 42 are coupled to the 50 kHz. unit such that the 1.5 kHz. signal is coupled to the horizontal deflection driver while the 50 kHz. sawtooth is applied to the vertical deflection driver, and vice versa. As soon as a periodic signal is introduced to the lock-on unit, the 1.5 kHz. signal is blocked out, and bias feedback for each channel derived from biaxial separation amplifier 39 is coupled through lock-on circuit 40 to the horizontal and vertical deflection amplifiers respectively.

It is to be noted that the block diagram of FIG. 1 includes only the basic components of the present system, and does not include a number of additional or optional features, nor does it include standard components such as power supplies. A more complete understanding of the operation of the invention can be obtained after a discussion of the manner in which the target image is focused on the phototube.

Figure 2:
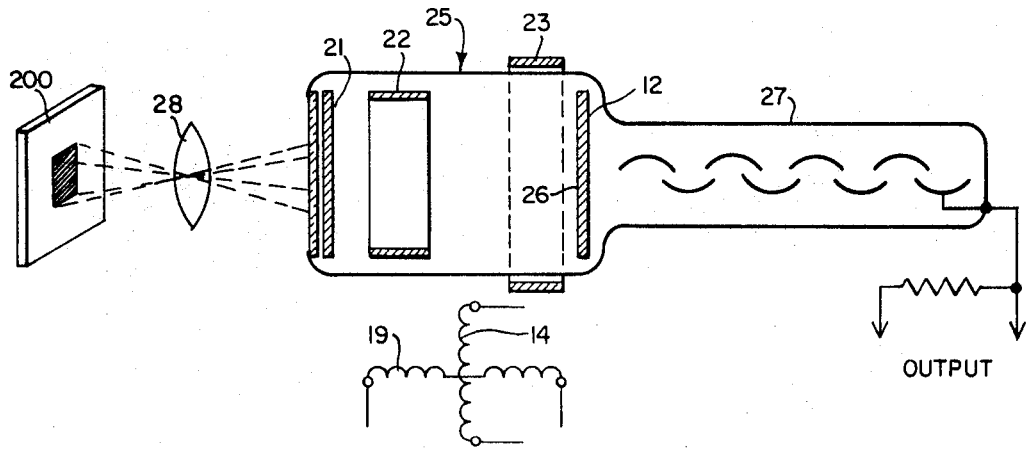
FIG. 2 is a diagram of a known form of camera tube of the image analyzer type.

One suitable form of camera tube 25 is illustrated diagrammatically in FIG. 2. This is a known form of image analyzer tube having the usual energy-sensitive photo cathode 21, accelerating electrode 22, focusing electrode 23, image shield 12 with central aperture 16, and electron multiplier section 27. A lens 28 focuses the target 200 on the photo cathode 21.

In FIGS. 1 and 2, the camera tube 25 is illustrated as provided with vertical deflection coils 14 and also with horizontal deflection coils 19. Deflection current to the vertical coils 14 is derived from the 50 kHz. sawtooth generator 26 and delivered by the vertical deflection drive 31. Similarly, horizontal deflection drive 32 provides the necessary deflection current to the horizontal deflection coils 19.

Figure 3:
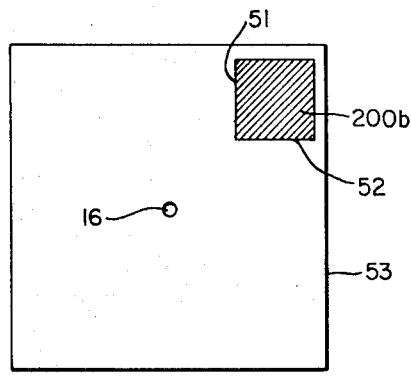
FIGS. 3, 4, 5 and 6 are diagrams of target images on the aperture plate when the target is in four different positions.
Figure 4:
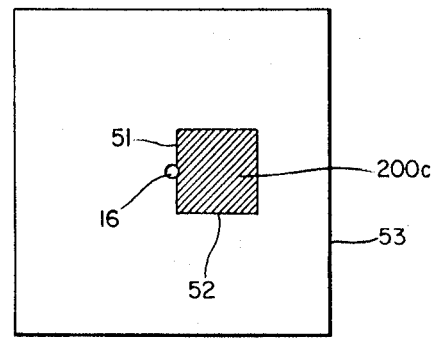
Figure 5:
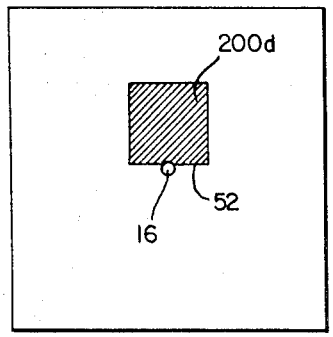
Figure 6:
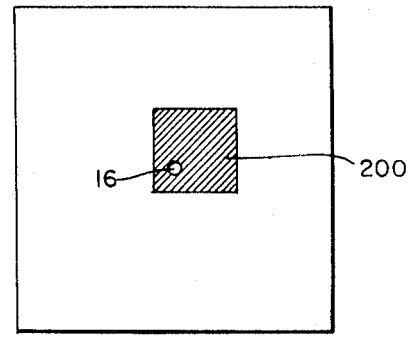

In a typical case, the target 200 would be positioned upon a piece of work whose high-speed vibration, displacement (angular or linear) or other movement is to be detected, observed and measured. In many instances, the tube 25 would be focused on the edge of the work. However, in most situations, a target of generally rectangular shape is attached to the object. The target is designed to present a two-dimensional black-white discontinuity. This may be achieved by a two-dimensional target of any form having orthogonal discontinuities. Thus, a black rectangular target may be placed on a white object, or vice versa. Similarly, the target itself may be comprised of a black rectangle, with a larger white border, such that the actual target discontinuity is formed by the inner black rectangle. In describing the present invention, it will be convenient to assume that the target is black and of rectangular shape. The image analyzer tube 25 is focused such that the field of view embraces at least two of the discontinuities of the target. This is illustrated in FIG. 3, showing horizontal discontinuity 51 and vertical discontinuity 52. The optical image of the target is focused on a photo cathode 21 of the image analyzer tube 25 by the lens 28, and an electron image is emitted from the inner surface of the photo cathode 21 and focused on the image shield 12. The electron image 200(c) of the target 200, when the beam is centered such that horizontal discontinuity 51 coincides with aperture 16, is illustrated in FIG. 4. Similarly, the electron image 200(d) of the target 200, when the beam is centered such that target edge 52 is coincident with aperture 16, is illustrated in FIG. 5. A normal target position within the field of view is shown in FIG. 6, representing the situation after lock-on, with DC currents through the deflection coils being maintained such that optical discontinuities in both axial directions will be coincident with aperture 26 at some portion of each of the vertical and horizontal sweeps.

In accordance with this invention, the electron image of the black target 200 is deflected first vertically up and down across the aperture 16, and then horizontally back and forth across the aperture 16, at a repetition rate which may be high relative to the expected rate of target vibration in either axial direction. As a result, the electron image at the aperture 16, for the first cycle of generator 26, is all black or all white except for the short time duration during which the target discontinuity moves past the aperture in one direction, and correspondingly for the same short time duration when it moves past the aperture in the other direction. Alternately, during the next period of the sawtooth, the electron image is swept back and forth in the orthogonal axial direction, again producing two short time intervals of optical discontinuity.

As a result of the aforementioned vertical and horizontal deflections of the electron image, the output of the electron multiplier section 27 of the image analyzer tube 25 changes from a low level to a high level and then back to low as the electron image at the aperture 16 changes from all black to all white and then back to all black. A finite period of time is required for the optical discontinuity 51 or 52 of the electron image to cross the aperture 16. Accordingly, the waveform of the output of the phototube 20 has the shape indicated in FIG. 9(a) in which the low-level black signal and the high-level white signal are connected together by steeply sloping lines, representing the change in output which occurs as the discontinuity of the electron target moves across the aperture 16. It is to be noted that the trapezoidal peaks of the waveform shown in FIG. 9(a) represent alternately the positions of the vertical and horizontal discontinuities 51 and 52 respectively.

Referring again to FIG. 1, the function of the level detector 37 is to convert the waveform of FIG. 9(a) into a rectangular pulse waveform as shown in FIG. 9(c), the leading edge of each successive pulse representing alternately the time of intercepting a vertical discontinuity 52 and a horizontal discontinuity 51.

It is appreciated that in the event there is angular movement of the observed object about an axis perpendicular to the line of sight of the tube 25, such angular rotation cannot be linearly detected by the arrangement depicted in FIG. 1. Referring to FIG. 7, it is seen that such angular displacement can be presented to the tube 25 by placing the target 200 in a fixed position remote from the object, and mounting a mirror 60 upon the rotating object, such mirror being mounted in position relative to tube 25 and target 200 such that the target is focused through lens 28. Upon angular rotation of the object and mirror 60, the target image is displaced in such a way as to be detected as a linear displacement by tube 25. Thus, by either placing a target 200 on the object to be observed, or by removing target 200 and utilizing a mirror 60, displacement in either of two directions, or angular displacement, may be detected and observed with the apparatus of this invention.

Before describing the present invention in detail, it will be helpful to explain the function of lock-on circuit 40. Referring to FIG. 8, it is assumed that the target 200 is located in the upper right-hand quadrant of the field of view 53. Under these circumstances it is seen that if the image of the target 200 were swept only horizontally, along dotted line 8H, at no time would a discontinuity be noted at aperture 16. Similarly, if the image of the target 200 were swept only vertically as indicated by dotted line 8V, again no discontinuity would be noted at aperture 16. The lock-on circuit provides a relatively slowly varying bias which is provided to one deflection coil while the other deflection coil sweeps through one cycle of the relatively high frequency sweep signal. Thus, as shown in FIGS. 8(b) and 8(c), first the horizontal deflection plates are swept with one cycle lasting 20 microseconds, and then the vertical plates are swept for one cycle lasting 20 microseconds. While the horizontal deflection coil is being driven, a bias is placed upon the vertical deflection coil corresponding to the magnitude of the relatively slow 1.5 kHz. biasing signal shown in FIG. 8(d), as provided by the lock-on circuit. This latter signal is sufficiently slow that, during the 20 microsecond period, the bias can be considered to be constant. However, during the time period of the 1.5 kHz. signal, i.e., 667 microseconds, the bias will be swept through a complete range. Thus, the target image 200 will be swept across the entire area of the field of view, until the bias conditions provided by the 1.5 kHz. signal are such that both target discontinuities 51 and 52, or the other two edges of the rectangular target, are detected in successive sweeps of the horizontal and vertical deflection coils respectively. When such a condition occurs, output signals from the biaxial separation amplifier, representing the position of the target within the field of view, are coupled into deflection coils 19 and 14 through lock-on circuit 40, thus holding the target in a position such that the higher frequency horizontal and vertical displacements can be detected each cycle.

The broad scope of the invention having been described hereinabove, it is now convenient to describe the outputs of the various components of the basic system. This is done corresponding to a target location as shown in FIG. 6, after lock-on has been acquired. It is to be understood that generally, due to the high-speed vibration, target 200 will be displaced more in one axial direction than in another. Thus, the periods of light and dark will generally be unequal. The output of the camera tube 25 may be as indicated graphically in FIG. 9(b).

As there shown, the tube output signal will be at the black level for more than half of the deflection cycle, and at the light level for less than half of the deflection cycle. Assume that the level detector 37 has been adjusted to be triggered by an output value corresponding to that represented by the dot on the upward slope of the waveform of FIG. 9(b). In such case, the level detector is triggered and produces an output pulse such as is represented graphically in FIG. 9(c). This is a pulse with a steep leading edge. The leading edge is positive going, assuming that level detector 37 has been set to operate in the black-to-white mode. If set to operate in the white-to-black mode, the leading edge of the output pulse of the level detector will be negative going. It will be assumed that the level detector is set to operate in the black-to-white mode. Note that the output of the level detector, shown in FIG. 9(c), will generally have unequal time durations between successive pulses. Only in the instance where the vertical and horizontal target displacements are equal will $T_1$ equal $T_2$.

Figure 9:
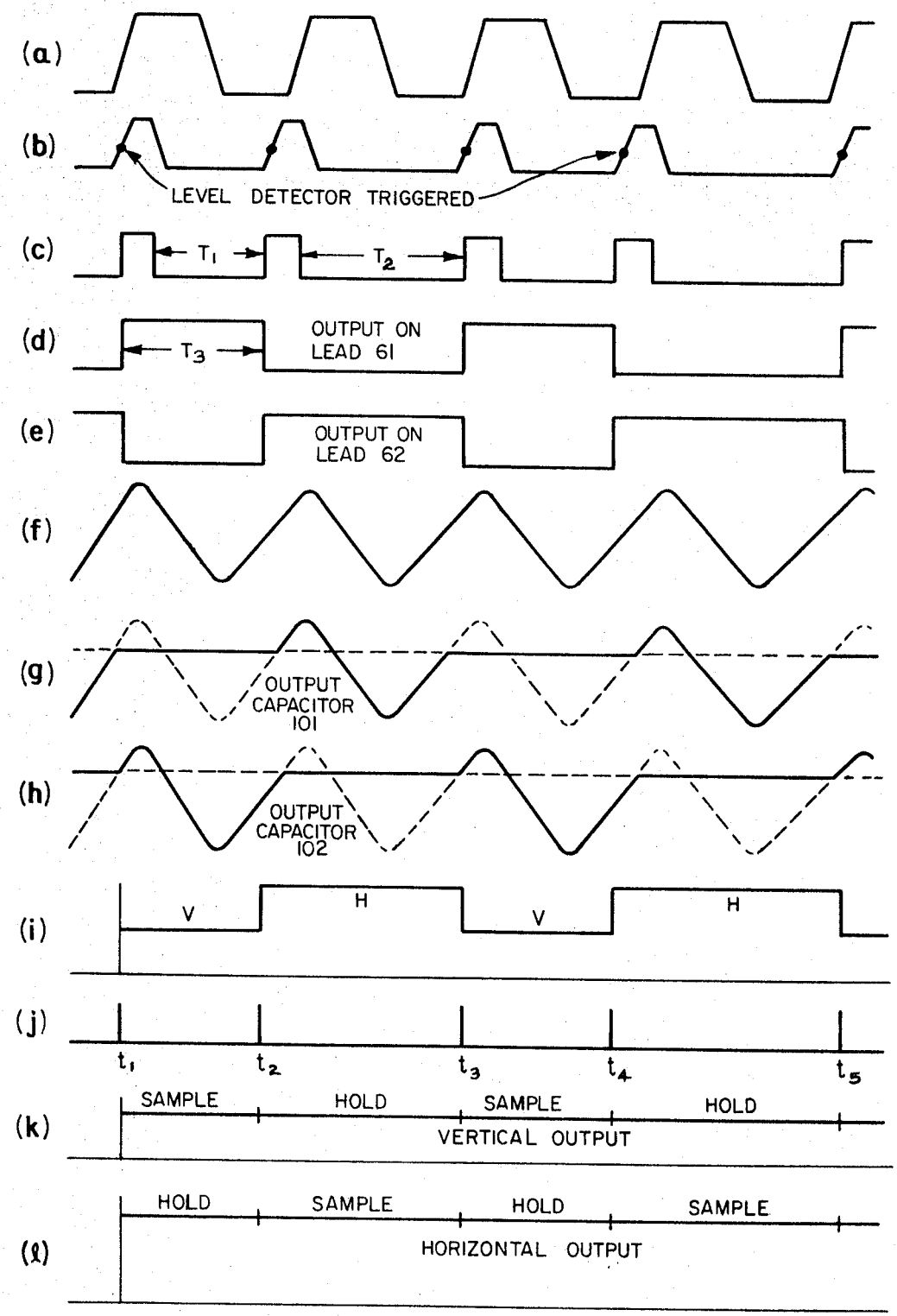
FIG. 9 shows representative waveforms at various points in the system.

The sampling flip-flop 36 has, when in a stable state, a high-level output and a low-level output, one on lead 61 and the other on lead 62. Which of the leads has the high-level output, and which the low, depends upon the state of the flip-flop 36. In FIG. 9, the waveform 9(d) represents the signal on lead 61, and waveform 9(e) represents the signal on lead 62. The signals on leads 61 and 62 are applied, respectively, to the follow and hold circuit 38.

Figure 10:
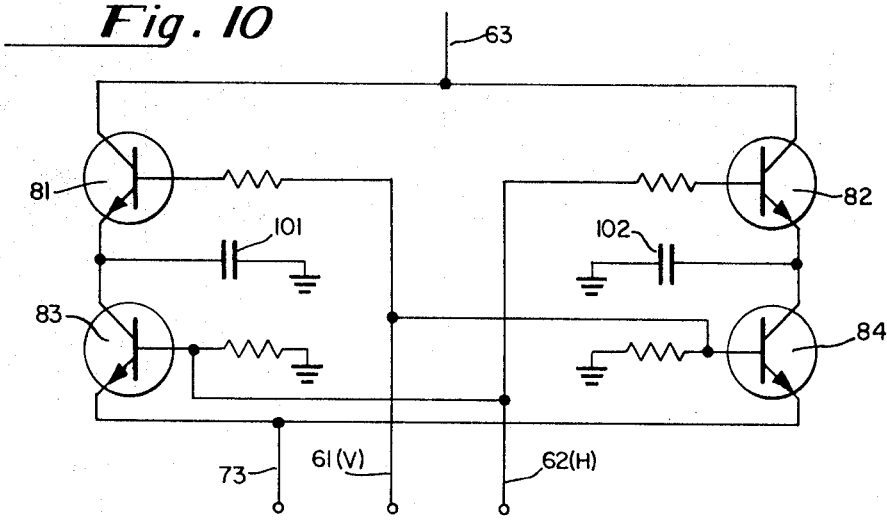
FIG. 10 is a schematic diagram of the follow and hold circuit.

Referring now to FIG. 10, showing the follow and hold circuit, the signals on leads 61 and 62 are applied, respectively, to a pair of electronic switches 81 and 82, preferably transistor switches. Since one signal is high and the other low, one of these transistor switches will close (the transistor will conduct) and the other will open (the transistor will be cut off). It will be assumed that the circuit has been so arranged that a high-level signal closes the switch and a low-level signal opens the switch. Thus, at time $t_1$ as shown in FIG. 9(j), at which time the level detector is triggered during the vertical sweep, the signal of FIG. 9(d) will close transistor switch 81 and the signal of FIG. 9(e) will open transistor switch 82. This condition is maintained until time $t_2$, when a horizontal discontinuity is detected by the level detector, and lead 62 attains a high level, thereby closing transistor switch 82 and opening transistor switch 81.

At time $t_1$, when switch 81 is closed, due to the high voltage on lead 61, the low voltage on lead 62 is coupled to transistor switch 82, opening it, and the high voltage on lead 61 is coupled to transistor switch 84, closing it. Consequently, under these conditions, capacitor 102, tied to ground between switches 84 and 82, charges and thus follows the input signal. Capacitor 101, which had previously been charged to the value of the vertical deflection signal at time $t_1$, is coupled through the closed switch 81 to the output on lead 63. At time $t_2$, the signals on leads 61 and 62 reverse, such that the voltage on capacitor 102, representing the horizontal deflection at the instant $t_2$, is coupled through closed switch 82 to output lead 63, and the input is coupled through closed switch 83 to capacitor 101, which follows the input signal. As switch 81 is now open, capacitor 101 does not discharge. Thus, the output of the follow and hold circuit on lead 63 represents alternately the stored voltage on capacitor 101, as shown in FIG. 9(g), and the voltage on output capacitor 102, as shown in FIG. 9(h). The combined output, as shown in FIG. 9(i), has discontinuities at the times $t_1$, $t_2$, etc., representing the fact that the vertical and horizontal deflection signals are sampled alternately. This combined signal is coupled to the biaxial separation amplifier 39 by lead 63.

Figure 11:
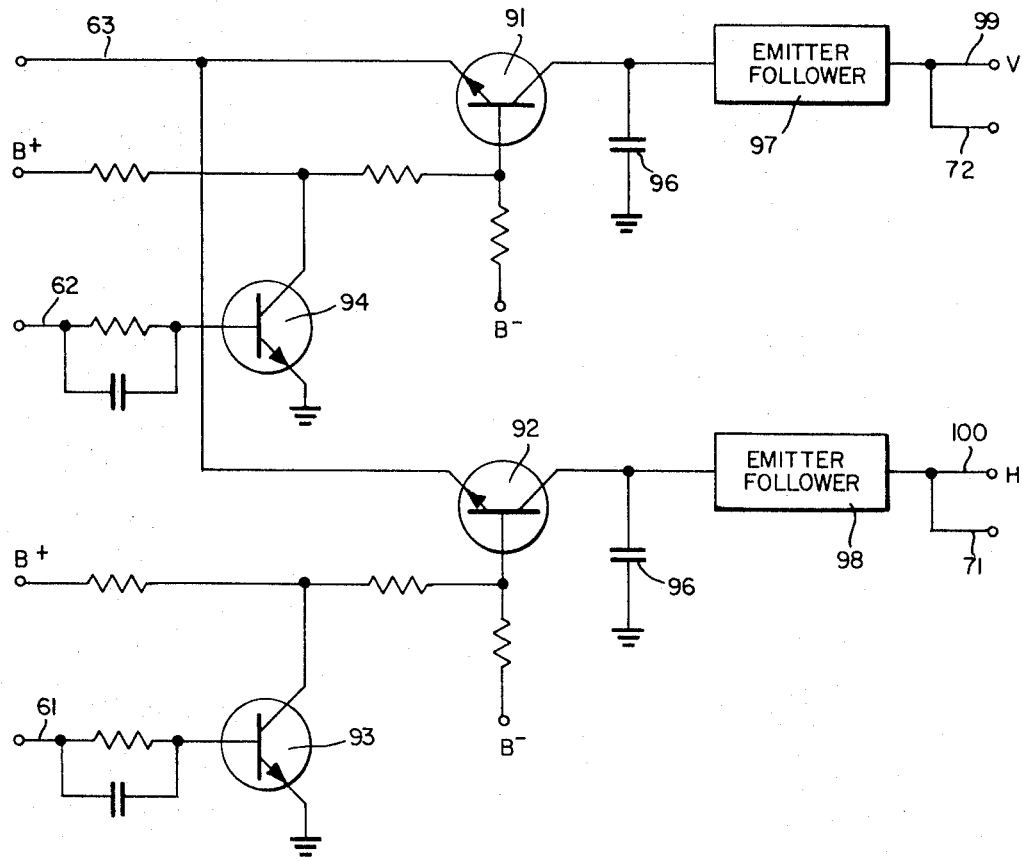
FIG. 11 is a schematic diagram of the biaxial separation amplifier.

Referring now to FIG. 11, a schematic diagram of the biaxial separation amplifier is shown, with the input signal on line 63 coupled to transistor switches 91 and 92. The outputs of sampling flip-flop 36 on leads 61 and 62 are coupled respectively to transistor switches 93 and 94. When lead 61 carries a high signal and lead 62 carries a low signal, as shown during $T_3$ in FIG. 9, transistor switch 93 is closed, providing an effective short circuit, and transistor switch 94 is opened, providing an effective open circuit. Under these conditions, transistor switch 92 is caused to open, and transistor switch 91 is caused to close, passing the input signal through to capacitor 95. Consequently, from time $t_1$ to $t_2$, the combined signal on lead 63 is coupled through to capacitor 95, and through emitter follower 97 to the vertical output terminal 99. At time $t_2$, the signals on leads 61 and 62 reverse, causing transistor switch 91 to open and transistor switch 92 to close. Under these conditions, the signal voltage at time $t_2$ is maintained across storage capacitor 95, such that the output at terminal 99 is held constant from time $t_2$ to $t_3$. Similarly, switch 92 being closed, the signal on lead 63 is now transmitted directly through to capacitor 96, and through emitter follower 98 to horizontal output terminal 100. At time $t_3$, when the sampling flip-flop signal is reversed, the horizontal sample signal is held on capacitor 96, which maintains the horizontal signal at terminal 100 until time $t_4$. In this manner, the two sampled signals are provided as continuous signals, as shown in FIGS. 9($k$) and 9($l$).

The outputs from terminals 99 and 100, representing the instantaneous vertical and horizontal displacements respectively, are conventionally amplified and recorded and/or displayed. The same signals, on leads 72 and 71 respectively, are coupled to the lock-on circuit. When lock-on has been obtained, these signals are fed directly through the lock-on circuit on leads 42 and 41 respectively, as bias signals to deflection drivers 32 and 31 respectively. These bias signals insure that, once lock-on has been obtained, it will not be lost.

Figure 12:
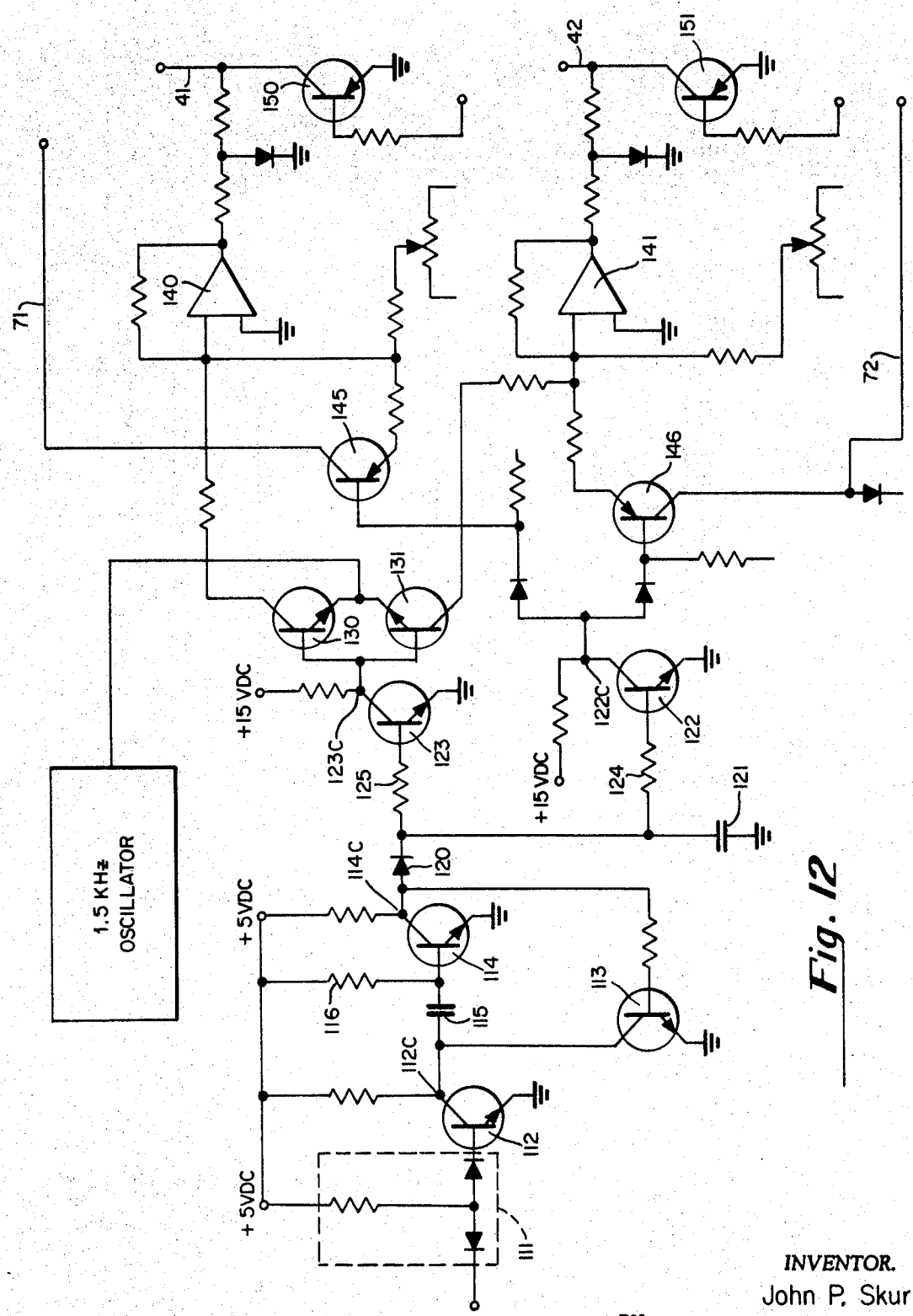
FIG. 12 is a schematic diagram of the lock-on circuit.

Referring now to FIG. 12, the input to the lock-on circuit is coupled from sampling flip-flop 36 on lead 62. This input is a chain of pulses as shown in FIG. 9($e$), having a duty cycle which varies depending upon target location. It is to be recalled that there is an AC signal present only when the target has been obtained in both dimensions. The signal varies roughly from 0 (ground) to plus 14 volts.

The incoming AC signal is passed through a diode-resistor-diode combination 111 which acts to convert the pulse train to pulses of approximately 5 volts in magnitude. Transistors 112, 113 and 114 act as a "single shot" circuit, the purpose of which is to shape up the incoming pulse train into pulses of a time duration such that they can be properly integrated. Transistors 112, normally off and having its collector at plus 5 v. DC, is turned on by an incoming pulse, as at time $t_2$. This drops the collector 112C to appreciably ground, the 5 volt drop being placed on the base of transistor 114, thus turning normally on 114 to the off condition. This raises collector 114C which is normally at ground to approximately plus 5 v. DC Collector 114C is tied through a feedback path to the base of transistor 113 which is saturated by the plus 5 voltage, thus typing capacitor 115 to ground. Capacitor 115, having approximately 5 volts across same at the time the pulse comes through, discharges through resistor 116, having a time constant of R116 times C115, which time constant is adjusted in accordance with the integrator circuit that follows. When capacitor 115 has appreciably discharged, transistor 114 turns on again, and the collector 114C returns to its normally zero position. The next time another pulse is introduced at the input terminal, at $t_4$, the same procedure is repeated. Thus, although the pulse train at the input may have a varying duty cycle, the pulse train output at collector 114C has a constant duty cycle as determined by the RC combination of the single shot.

The output of the single shot is integrated, through the combination of diode 120 tied in series with capacitor 121. In the absence of any incoming AC signal, capacitor 121 would have no charge or voltage across same, as collector 114C is maintained at ground. The existence of an incoming AC signal will charge capacitor 121 to a positive value, the voltage across same being transmitted to the bases of transistors 122 and 123 through resistors 124 and 125 respectively. Transistors 122 and 123, normally off, are turned on, essentially grounding the collectors of each. Collector 123C is tied to the bases of transistors 130 and 131, which transistors are normally saturated and provide short circuits to the output of the conventional 1.5 kHz. oscillator, which is fed into the emitters of same. When collector 123C is grounded, transistors 130 and 131 are turned off, thus blocking transmission of the 1.5 kHz. signal. In the absence of an AC signal, collector 123C is at approximately +5 v. DC turning transistors 130 and 131 on, allowing the 1.5 kHz. signal to be transmitted through amplifiers 140 and 141 respectively, to leads 41 and 42.

Feedback from the biaxial output separation amplifier is coupled into the circuit by leads 71 and 72. In the absence of AC, with collector 122C at ground, the bases of transistors 145 and 146 are maintained at a positive value, thus keeping them open and preventing feedback through amplifiers 140 and 141. When the presence of an AC signal causes collector 122C to be driven to ground, transistors 145 and 146 are turned on, and passing the feedback signals on leads 71 and 72 into amplifiers 140 and 141 respectively.

It is thus seen that when an AC signal is present, representing biaxial target lock-on, the 1.5 kHz. signal is blocked and is not transmitted through to the deflection drivers, while the feedback signals from the biaxial separation amplifier are fed through. Conversely, in the absence of such an AC signal, the feedback signals are blocked, and the 1.5 kc. oscillator signal is transmitted through to the horizontal and vertical deflection drivers.

The outputs from the target lock-on circuit appear on leads 41 (horizontal) and 42 (vertical). In order to properly gate these outputs, they are shunted by switching transistors 150 and 151 respectively. These transistors in turn are driven by outputs from generator 26. When transistor 150 is on, no signal is passed to the horizontal deflection driver. Simultaneously, 151 is off, and the signal is passed to the vertical deflection driver. In the next half cycle, 151 is on, allowing no signal to the vertical deflection driver, and 150 is off, allowing transmission of a signal to the horizontal deflection driver. In this manner, the bias signals from the lock-on circuit are coordinated with the signals from generator 26 which are coupled into deflection drivers 31 and 32.

While specific components and circuitry for accomplishing the desired tracking or detecting have been illustrated and described, variations in such components and circuitry are possible within the scope of the invention. For example, instead of deriving the output signals by operating on the combined deflection signal with the camera-tube output, as is done in the preferred embodiment, the signals can be derived by operating on the camera-tube output with the combined deflection signal. It is seen in FIG. 9($c$) that the camera-tube signal (after having been shaped by the level detector) contains all information with respect to displacement in both axial directions, when referenced with the deflection signal shown in FIG. 9($f$). Accordingly, the camera-tube signal can be coupled directly to a biaxial separation circuit comprised of conventional information-detecting means, such as a filter or discriminator, and operated on with the deflection signal to obtain the desired two output signals.

From the description hereinabove, it is apparent that the system of this invention can be used to detect target movements having both vertical and horizontal components, and in the embodiment diagramed in FIG. 7, angular displacement. It is also apparent that the apparatus of this invention can be used for determination of linear displacement in the plane perpendicular to the optical device, by utilizing the feedback bias signals which are coupled to the deflection driver. Such feedback signals reflect respectively the horizontal and vertical positions of the target. For such linear displacement determination, the target size is limited to one-tenth of the field of view, i.e., the lock-on circuit will enable following of any target size greater than one-tenth of the field of view.

What is claimed is:

1. An apparatus for detecting biaxial displacement of a target having orthogonal optical discontinuities, comprising: a lock-on circuit having an AC input terminal, two feedback input terminals, and two output terminals, a low-frequency oscillator, first switching means coupled to said oscillator, coupling the output of said oscillator to said two output terminals when no AC signal is coupled to said AC input terminal and blocking said output of said oscillator when an AC signal is coupled, and second switching means alternately coupling the signals on said two feedback input terminals to said two output terminals when an AC signal is coupled to said AC input terminal, and blocking the signals on said two feedback input terminals when no AC signal is coupled to said AC input terminal.

2. Apparatus for detecting biaxial displacement of an object represented by a target, said target having orthogonal optical discontinuities, said apparatus comprising:
   a. camera tube means, to produce a target image of at least such a part of said target as contains a plurality of said optical discontinuities, having horizontal and vertical deflection elements used for changing the position of said target image, and which develops a camera-tube output signal which varies with said position;
   b. deflection signal means to generate deflection signals which drive said deflection elements, and to provide a combined deflection signal which is the sum of said deflection signals;
   c. first bistable circuit means, controlling said deflection signal means to alternately drive said horizontal and vertical deflection elements, whereby said combined deflection signal is composed alternately of the signal driving the horizontal deflection element and the signal driving the vertical deflection element;
   d. combined deflection signal separating means, driven by said camera-tube output signal and controlled by said first bistable circuit means, to operate on said combined deflection signal to simultaneously generate two distinct output signals corresponding to the displacement of said target in each of two orthogonal axial directions; and
   e. lock-on means coupled to and driven by said combined deflection signal separating means to search for said target image within the field of view of said camera-tube means and to deflect and maintain said target image in a position such that said camera-tube output signal contains information corresponding to the positions of two of said orthogonal optical discontinuities, said lock-on means comprising a low-frequency generator having a frequency lower than that of said deflection signal, the output of which is gated to said deflection driver means when said camera-tube output signal does not contain said information, and gating circuitry which gates said distinct output signals to said deflection driver means when said camera-tube output signal contains said information.

3. The apparatus as described in claim 2 wherein said combined deflection signal separating means comprises level detector means driven by said camera-tube output signal to generate signals in response to changes in the level of said camera-tube output signal, second bistable circuit means driven by the output of said level detector and controlled by said first bistable circuit means to develop high-level and low-level signals, sampling means to sample said combined deflection signal, coupling means coupling said high-level and low-level signals to said sampling means to cause same to sample said combined deflection signal at instants corresponding to said changes in the level of said camera-tube output signal, and biaxial separation amplifier means controlled by said second bistable circuit means to separate the output of said sampling means into said distinct output signals corresponding to the instantaneous displacement of said target in each of two orthogonal axial directions.

4. The apparatus as defined in claim 2 wherein a component of said displacement of said object may be angular, comprising angular displacement detection means including a target positioned remote from said object and a mirror positioned on said object, said mirror cooperating to reflect an image of said target within the field of view of said camera-tube.

5. Apparatus for detecting biaxial displacement of a target which has orthogonal optical discontinuities, comprising:
   a. camera-tube means, to produce a target image of said target, having horizontal and vertical deflection elements used for changing the position of said target image, and which develops a camera-tube output signal which varies with said position;
   b. biaxial deflection signal means to generate deflection signals which drive said deflection elements, and to provide a biaxial deflection signal output;
   c. biaxial output means coupled to the output of said biaxial deflection signal means and also to the output of said camera-tube means, to simultaneously generate biaxial output signals corresponding to the displacement of said target in each of two orthogonal directions; and
   d. locking means coupled to said biaxial deflection signal means and to said biaxial output means for controlling the position of said target image such that said camera-tube output signal continuously contains information corresponding to the displacements of said orthogonal optical discontinuities, said locking means comprising a low-frequency generator having a frequency lower than that of said biaxial deflection signal means, the output of which is periodically gated to said biaxial deflection signal means.

6. Apparatus as described in claim 5 wherein said biaxial output means includes biaxial deflection signal separating means for operating on said biaxial deflection signal with said camera-tube output signal.

* * * * *